United States Patent [19]
Soliman

[11] Patent Number: 6,101,179
[45] Date of Patent: Aug. 8, 2000

[54] ACCURATE OPEN LOOP POWER CONTROL IN A CODE DIVISION MULTIPLE ACCESS COMMUNICATION SYSTEM

[75] Inventor: Samir S. Soliman, San Diego, Calif.

[73] Assignee: QUALCOMM Incorporated, San Diego, Calif.

[21] Appl. No.: 08/933,889

[22] Filed: Sep. 19, 1997

[51] Int. Cl.[7] .................................................. H04J 13/02
[52] U.S. Cl. .......................................... 370/342; 455/522
[58] Field of Search ..................................... 370/342, 479, 370/310, 311, 318, 320, 328, 335, 441, 522; 455/522, 69, 67.1, 67.3, 68

[56] References Cited

U.S. PATENT DOCUMENTS

| | | |
|---|---|---|
| 4,777,653 | 10/1988 | Bonnerot et al. . |
| 4,811,421 | 3/1989 | Havel et al. . |
| 4,868,795 | 9/1989 | McDavid . |
| 5,056,109 | 10/1991 | Gilhousen . |
| 5,093,840 | 3/1992 | Schilling . |
| 5,101,501 | 3/1992 | Gilhousen et al. . |
| 5,103,459 | 4/1992 | Gilhousen et al. . |
| 5,257,283 | 10/1993 | Gilhousen et al. . |
| 5,265,119 | 11/1993 | Gilhousen et al. . |
| 5,267,262 | 11/1993 | Wheatley, III . |
| 5,305,468 | 4/1994 | Bruckert et al. . |
| 5,349,630 | 9/1994 | Sointula ................................... 455/343 |
| 5,383,219 | 1/1995 | Wheatley, III . |
| 5,450,616 | 9/1995 | Rom . |
| 5,465,399 | 11/1995 | Oberholtzer et al. . |
| 5,469,471 | 11/1995 | Wheatley, III . |
| 5,487,180 | 1/1996 | Ohtake . |
| 5,857,155 | 1/1999 | Hill et al. ................................ 455/522 |
| 5,946,346 | 8/1999 | Ahmed et al. ......................... 455/522 |
| 5,956,649 | 9/1999 | Mitra et al. ............................ 455/522 |

FOREIGN PATENT DOCUMENTS 9406218  3/1994  WIPO ........................... H04B 7/005

OTHER PUBLICATIONS

Soliman, et al. "CDMA Reverse Link Open Loop Power Control" Communication for Global Users, Including a Communications Theory Mini Conference vol. 1: pp. 69–73 (Dec. 6, 1992).

Primary Examiner—Huy D. Vu
Attorney, Agent, or Firm—Russell B. Miller; Roger W. Martin

[57] ABSTRACT

A method and system for open loop power control in a CDMA communication system. The method and system controls the power of a mobile station transmission signal in a CDMA communication system having a base station which transmits a pilot signal. The method includes calculating, in the base station, a base station pilot transmit power value, and a base station receiver sensitivity value. The base station transmits the pilot transmit power value and the receiver sensitivity value to said mobile station. In turn, the mobile station calculates a mean output power in response to the base station pilot transmit power value and the base station receiver sensitivity value.

10 Claims, 2 Drawing Sheets

ACCURATE OPEN LOOP POWER CONTROL IN A CODE DIVISION MULTIPLE ACCESS COMMUNICATION SYSTEM

BACKGROUND OF THE INVENTION

I. Field of the Invention

The present invention relates to digital wireless communication systems. More particularly, the present invention relates to a novel and improved method and apparatus for performing accurate open loop power control in a code-division multiple access (CDMA) communication system.

II. Description of the Related Art

In the field of wireless communications, several technology-based standards exist for controlling communications between a mobile station, such as a cellular telephone, Personal Communication System (PCS) handset, or other remote subscriber communication device, and a wireless base station. These include both digital-based and analog-based standards. For example, among the digital-based cellular standards are the Telecommunications Industry Association/Electronic Industries Association (TIA/EIA) Interim Standard IS-95 series including IS-95A and IS-95B, entitled "Mobile Station—Base Station Compatibility Standard for Dual-Mode Wideband Spread Spectrum Cellular System." Similarly, among the digital-based PCS standards are the American National Standards Institute (ANSI) J-STD-008 series, entitled "Personal Station—Base Station Compatibility Requirements for 1.8 to 2.0 GHz Code Division Multiple Access (CDMA) Personal Communication Systems."

The spread spectrum modulation technique of CDMA has significant advantages over other modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention and incorporated by reference herein.

Space or path diversity is obtained by providing multiple signal paths through simultaneous links from a mobile station through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501, issued Mar. 31, 1992, entitled "SOFT HANDOFF IN A CDMA CELLULAR TELEPHONE SYSTEM", and U.S. Pat. No. 5,109,390, issued Apr. 28, 1992, entitled "DIVERSITY RECEIVER IN A CDMA CELLULAR TELEPHONE SYSTEM", both assigned to the assignee of the present invention and incorporated by reference herein.

The deleterious effects of fading can be further controlled to a certain extent in a CDMA system by controlling transmitter power. A system for cell-site and mobile station power control is disclosed in U.S. Pat. No. 5,056,109, issued Oct. 8, 1991, entitled "METHOD AND APPARATUS FOR CONTROLLING TRANSMISSION POWER IN A CDMA CELLULAR MOBILE TELEPHONE SYSTEM", also assigned to the assignee of the present invention and incorporated herein by reference. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", assigned to the assignee of the present invention and incorporated by reference herein.

Fundamental to the concept of cellular or PCS telephony in a CDMA system is the process of power control. A CDMA communication system is an interference limited system in the sense that the system capacity (i.e., the number of simultaneous calls) is a function of the maximum amount of interference that the system can tolerate. The amount of interference depends on the received signal level from each mobile station. The output power of each mobile station must be controlled so as to guarantee enough signal strength received at the base station to maintain good signal quality. The system capacity is maximized if the transmit power of each user is controlled so that the signal power at the cell receiver is the minimum required to achieve a predetermined signal-to-noise ratio (SNR). Hence, to achieve high capacity, the CDMA system employs power control on both forward and reverse links to solve the near-far problem, the corner problem, and long and short term channel variations.

In the open loop power control method according to IS-95, the mobile station uses the measured total received power along with typical values of certain base station parameters to get a rough estimate of the transmission loss between the unit and the base station. Based on these measurements, the forward link transmission loss is estimated and used to determine the proper open loop power control setting for the mobile station transmitter. The mobile station's transmit power is adjusted to match the estimated path loss, to arrive at the base station at a predetermined level. All mobile stations use the same process, and ideally their signal will arrive with equal power at the base station.

The base station parameters just mentioned are passed to the mobile station over the paging channel from the base station to the mobile station in an Access Parameters Message, described in detail in section 7.7.2.3.2.2 of IS-95. Of particular importance to the present invention are the fields NOM_PWR and INIT_PWR which are contained in the Access Parameters Message. The field NOM_PWR represents a correction factor to be used by the mobile station in its open loop power estimate, and the field INIT_PWR represents a correction factor to be used by the mobile station in the open loop power estimate for the initial transmission on an access channel.

The current algorithm for estimating the mobile station's desired transmit power for the first access probe on the access channel is given by:

$$\text{Mean Output Power (dBm)} = -73 - \text{Mean Recieved Power(dBm)} + \text{NOM\_PWR (dB)} + \text{INIT\_PWR (dB)}. \quad (1)$$

For subsequent probes on the access channel, each access probe sequence is sent at an increased power level until a response is obtained or the sequence ends. The amount of each increase is set by the field PWR_STEP, which is also sent in the Access Parameters Message. Then, the initial transmit power on the reverse traffic channel is specified to be:

$$\text{Mean Output Power (dBm)} = -73 - \quad (2)$$
$$\text{Mean Recieved Power(dBm)} +$$
$$\text{NOM\_PWR (dB)} +$$
$$\text{INIT\_PWR (dB)} +$$
$$\text{sum of all access probe}$$
$$\text{corrections (dB)}.$$

The values for NOM_PWR, INIT_PWR, and PWR_STEP are all defined by the base station, and sent to the mobile station prior to the mobile station's first transmission. The nominal value of NOM_PWR is 0 dB, with a range of −8 to 7 dB. The nominal value of INIT_PWR is also 0 dB with a range of −16 to 15 dB. The range of PWR_STEP is 0 to 7 dB.

Looking at Equations (1) and (2), one can see that a constant of −73 dB is used as the open loop power control constant. This value is a nominal value which was calculated as follows:

$$C = \frac{E_b}{N_t} + 10\log(kTR) + F + \quad (3)$$
$$10\log(P_t^c) - 10\log(1-x) + 10\log\left(1 + \sum_{i=1}^{M-1} \zeta_i\right)$$

evaluated at the fixed nominal values of:

$$\frac{E_b}{N_t} =$$

Bit energy to total noise power spectral density=7 dB
k=Boltzmann's constant=1.38×10⁻²³ Joule/Kelvin
T=Temperature of the receiver in Kelvin=290° K.
R=Data Rate=9.6 Kbps
F=Base station noise figure=5 dB
$P_t^c$=Total base station transmit power=20 Watts
X=Reverse link loading factor=50%
M=Equivalent number of cells surrounding the mobile station=2
$\zeta_i$=Ratio of power received from cell i to power received from mobile station's home cell=1.

From the above calculations, it is clear that the value of the open loop power control constant depends on many dynamically varying parameters. For example, the total base station transmit power may vary depending on whether the cell's effective radiation power (ERP) has been recently adjusted. The ratio of power received from cell i to the power received from the mobile station's home cell may vary depending on the location of the mobile station within the cell. When the mobile station is at the edge of its home cell's coverage, the ratio may increase. Conversely, when it is closer to the center of the home cell, the ratio may decrease. The number of cells surrounding the mobile station is clearly not the same for every cell. Some cells are more remotely located than others and will have fewer surrounding cells. The cell receiver noise figure may change due to maintenance or upgrading of the receiver. The reverse link Eb/Nt may change simply due to the nature of the dynamic wireless environment.

None of these dynamically changing variables is known, a priori, to the mobile station. Hence, the first probe power level will likely be in error because of the use of nominal values rather than actual values in calculating the open loop power control constant. As a result, when the mobile station is close to the base station, it will transmit at far too high of a power level than necessary to establish communications. To the extent that the transmit power level is too high, it constitutes unnecessary interference to the remaining mobile stations, reducing the capacity of the system. On the other hand, if the mobile station is far away, it may transmit the initial access probe at too low a power level, resulting in additional probes being sent. In addition to increasing call setup time, additional probes will result in more reverse link interference. What is needed is an improved method and apparatus for performing accurate open loop power control in a code-division multiple access (CDMA) communication system, which will increase the probability of successful completion of the first access probe and hence decrease the amount of reverse link interference.

SUMMARY OF THE INVENTION

The present invention is a novel and improved method and system for open loop power control in a CDMA communication system. The method and system controls the power of a mobile station transmission signal in a CDMA communication system having a base station which transmits a pilot signal. The method includes calculating, in the base station, a base station pilot transmit power value, and a base station receiver sensitivity value. The base station transmits the pilot transmit power value and the receiver sensitivity value to said mobile station. In turn, the mobile station calculates a mean output power in response to the base station pilot transmit power value and the base station receiver sensitivity value.

In order to calculate the mean output value, a power measurement circuit in the mobile station measures a total received power and a demodulator in the mobile station, for measures a signal to noise ratio of said pilot signal. A mobile station controller then calculates a forward link path loss in response to the pilot transmit power value, the total received power, the said signal to noise ratio. In the preferred embodiment, the signal to noise ratio is a ratio of energy per chip to total power spectral density of the pilot signal.

In order for the base station to determine the receiver sensitivity, a load monitor calculates a loading factor in response to a number of simultaneous calls currently being serviced by the base station. The base station receiver noise figure is stored in a memory element in the base station. A receiver in the base station determines an access channel ratio of energy per bit to total noise power spectral density. With this information, a base station controller calculates the base station receiver sensitivity value in response to the loading factor, the base station receiver noise figure, and the access channel ratio of energy per bit to total noise power spectral density.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
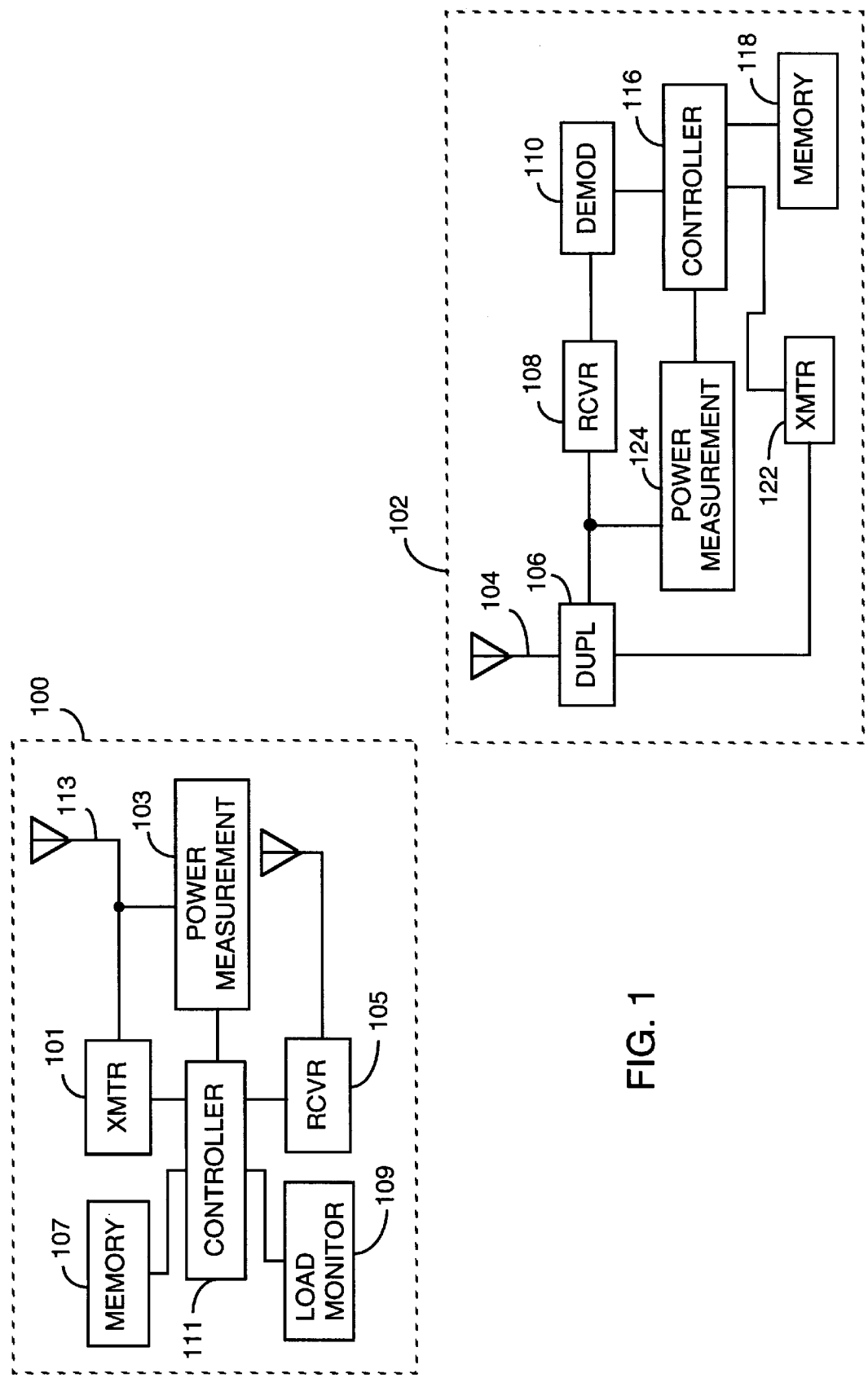
FIG. 1 is an illustration of the system of the present invention in block diagram format.

Referring now to FIG. 1, a block diagram of the system of the present invention is illustrated. Base station 100 is a CDMA base station which transmits a pilot channel as is known in the art and described further in IS-95. Base station 100 also transmits one or more traffic channels as are known in the art and further described in IS-95. Base station 100 also receives incoming CDMA signals transmitted by one or more mobile stations 102. Mobile station 102 is an off-the-shelf CDMA mobile station as is known in the art, and operates substantially according to IS-95 or one of the other CDMA standards including ANSI J-STD-008, with the exception of the open loop power control described herein.

Upon initialization, mobile station 102 seeks to acquire the pilot signal having the strongest received energy. The pilot signal transmitted, for example, by base station 100 is captured by antenna 104 of mobile station 102, and routed via duplexer 106 to receiver (RCVR) 108. Receive power measurement circuit 124, as part of the AGC system in mobile station 102, measures the total in-band power incident at receiver 108 and passes that total power measurement to mobile station controller 116. More details on AGC in power control can be found in the above-mentioned U.S. Pat. No. 5,056,109.

Receiver 108 downconverts the received pilot signal, and passes it to demodulator (DEMOD) 110. Demodulator 110 digitally demodulates the received pilot signal as is known in the art and described in the above-referenced patents and measures the energy per chip to total power spectral density ($E_c/I_0$) of the demodulated pilot signal, and passes that $E_c/I_0$ to mobile station controller 116.

Once the pilot signal is successfully demodulated in demodulator 110, mobile station 102 has an accurate coherent demodulation reference and is capable of demodulating the sync channel in order to obtain the timing of the base station's 100 pilot PN sequence with respect to system time and the paging channel data rate. Once the mobile station 102 has obtained information from the sync channel, it adjusts its timing to correspond to that of the base station 100, and begins to monitor its assigned paging channel.

As discussed above, one of the overhead messages carried on the paging channel is the Access Parameters Message. However, in the present invention, base station 100 does not send the Access Parameters Message exactly as it is described in section 7.7.2.3.2.2 of IS-95. In the present invention, the fields NOM_PWR and INIT_PWR are not sent. Instead, base station 100 sends a modified access parameters message in which two different fields, defined herein as PILOT_PWR and RCVR_SENS, and described further below are sent.

The field PILOT_PWR is defined as the transmit power, as measured by power measurement circuit 103 at the output of the base station transmitter 101, of the pilot signal. RCVR_SENS is proportional to the minimum power necessary for the base station receiver 105 to detect the signal. In a CDMA system, this is the sum of loading factor, base station receiver 105 noise figure, and an estimate of the access channel ratio of energy per bit to total noise power spectral density $E_b/N_t$, all in units of dB.

The base station noise figure is a calibrated value which is stored in the base station memory 109 at the time of installation of the base station receiver 105, or during change of the base station receiver 105 configuration. Base station controller 111 reads the stored noise figure value from base station memory 109. The base station receiver 105 provides controller 111 with the access channel $E_b/N_t$ during demodulation of the access channel. Specifically, a channel demodulating element (not shown) within receiver 105 calculates the access channel $E_b/N_t$ as is known in the art. The loading factor is measured by load monitor 109 and provided to base station controller 111. Loading factor is a function of the number of simultaneous calls currently in progress and the total number of simultaneous calls that the base station 100 has the capacity to handle. For example, the loading factor may be measured in the manner described in further detail in copending U.S. patent application Ser. No. 08/688,453, filed Jul. 30, 1996, entitled "LOAD MONITORING AND MANAGEMENT IN A CDMA WIRELESS COMMUNICATION SYSTEM," assigned to the assignee of the present invention and incorporated herein by reference.

With the above information, base station controller 111 calculates the fields PILOT_PWR and RCVR_SENS. The base station then transmits these fields to the mobile station 102 as part of the modified access parameters message. These fields PILOT_PWR and RCVR_SENS enable mobile station 102 to calculate a better estimate of the initial transmit power to be used on the access channel when transmitting access probes.

It should be noted that the present invention is not limited by the exact format of IS-95 messages, but is broadly applicable to any communication system in which the actual pilot transmit power and receiver sensitivity are sent to the mobile station. However, the phrase "modified access parameters message" will be used herein for convenience in referring to the message sent by the base station which includes the actual pilot transmit power and receiver sensitivity.

The mobile station 102 receives the modified access parameters message while monitoring its assigned paging channel. Demodulator 110 demodulates the modified access parameters message and passes the demodulated data to mobile station controller 116. Mobile station controller 116 parses the demodulated modified access parameters message data and extracts and stores the values for PILOT_PWR and RCVR_SENS in memory 118.

When it is necessary for mobile station 102 to send a message on the access channel, such as in order to initiate a call origination or perform a registration, mobile station controller 116 calculates the proper initial access probe power level to be used by transmitter 122. In order to calculate the proper initial access probe power level, mobile station controller 116 determines the forward link path loss. The forward link path loss is defined as the forward link transmission loss minus the gain of the base station antenna 113 and the gain of the mobile station antenna 104 relative to half-wave dipole antennas (including cable losses). The forward link transmission loss is the ratio of the output power of the base station transmitter 101 to the total power received at the termination of the receiving antenna 104 of mobile station 102. Since the pilot channel is always transmitted by base station transmitter 101 at a constant power level, the received pilot power can be used to measure the forward link transmission loss. In mathematical terms, the transmission loss is expressed as:

$$T(d) = 10\log\frac{P_p^r(d)}{P_p^t} \tag{4}$$

and therefore the path loss is:

$$L(d) = 10\log\frac{P_p^r(d)}{P_p^t} - G_x - G_r \tag{5}$$

where:

$P_p^r(d)$=the received pilot power at a distance, d, from the transmitter 101;

$P_p^t$=the transmitted pilot power at the base station transmitter 101 output;

$G_x$=the gain of the transmitting antenna 113 in dB relative to a half-wave dipole; and $G_r$=the gain of the receiving antenna 104 in dB relative to a half-wave dipole.

Thus, in order to estimate the forward link path loss, the mobile station controller 116 needs to know only the transmitted and received pilot powers. The transmitted pilot power, PILOT_PWR as described above, is sent on the paging channel as part of the modified access parameters message. The received pilot power is estimated by mobile station controller 116 by using the measured $E_c/I_0$ (signal to noise ratio) of the received pilot as measured by demodulator 110 and the total received power as measured by receive power measurement circuit 124, according to the following relationship:

$$P_p^r(d) = P_T^r \frac{E_c}{I_0} \tag{6}$$

where:

$P_T^r$=the total received power as measured by receive power measurement circuit 124.

With this information, mobile station controller 116 has sufficient information to calculate the forward link path loss as:

$$L_f(d) = P_p^r - P_p^t. \tag{7}$$

Mobile station controller 116 also calculates the base station receiver sensitivity as:

$$S = 10\log(kTR) + \text{RCVR\_SENS}. \tag{8}$$

Note that the value 10log(kTR), which is the thermal noise floor at the data rate R, may also be included in the value of RCVR_SENS if known by the base station 100, or alternately, the mobile station may use assumed values for T, the temperature, and R, the data rate.

Knowing the forward link path loss from equation (7) above, and the receiver sensitivity from equation (8) above, mobile station controller 116 can then calculate the mobile station transmit power necessary to arrive at base station receiver 105 with the minimum detectable level, thereby minimizing interference to other users while still ensuring adequate reception. The access probe is transmitted by transmitter 122 at a mean output power defined by:

$$\text{Mean output power } (dBm) = S - L_f(d). \tag{9}$$

Figure 2:
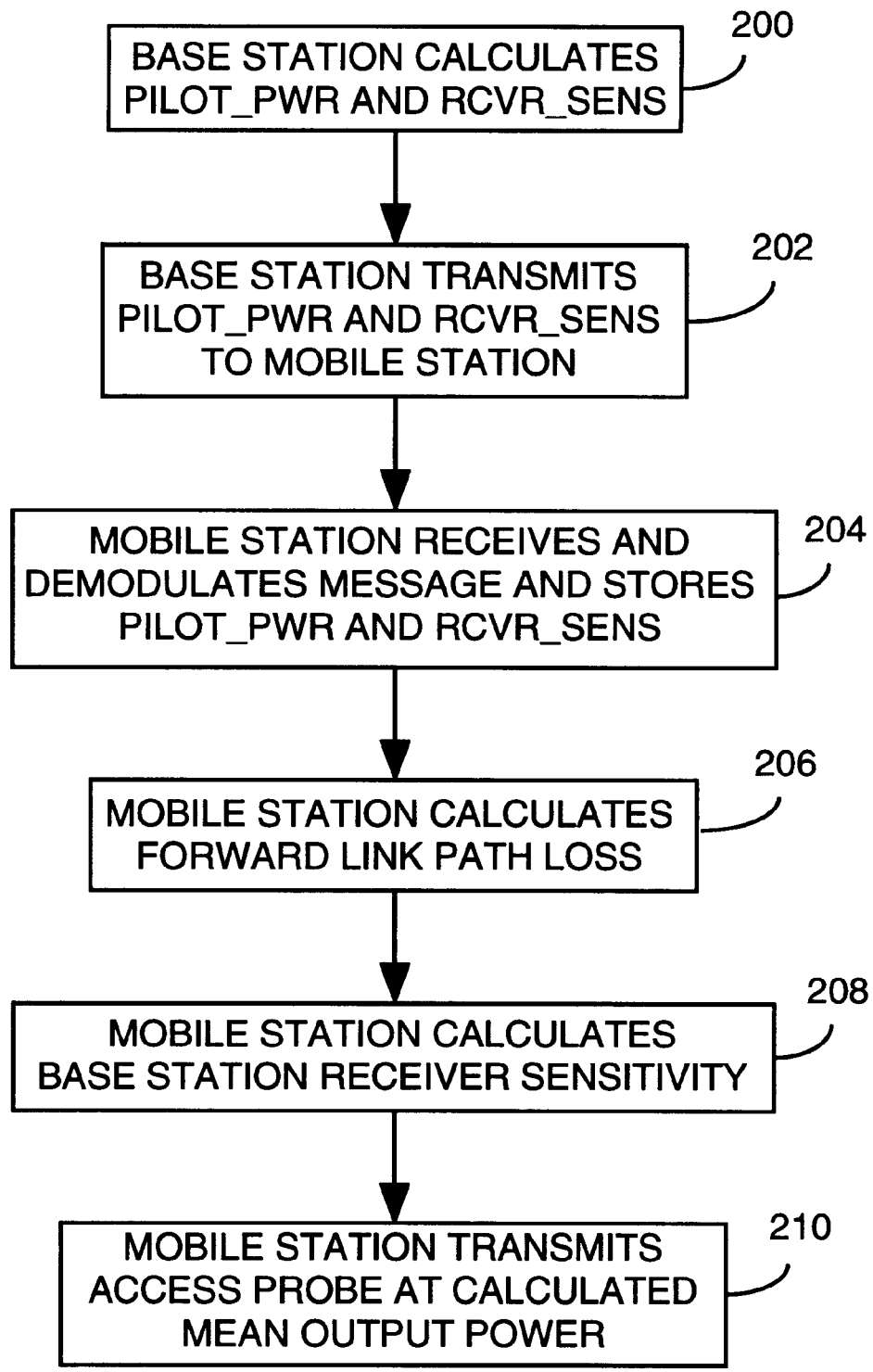
FIG. 2 is a flowchart of the method of the present invention as executed by the system of FIG. 1.

The method executed by the system of FIG. 1 described above is illustrated in FIG. 2. The process begins at block 200 where base station 100 calculates the two fields, PILOT_PWR and RCVR_SENS as described above. In block 202, base station 202 sends PILOT_PWR and RCVR_SENS to mobile station 102. At block 204, mobile station 102 receives, demodulates, and stores PILOT_PWR and RCVR_SENS. At block 206, mobile station controller 116 calculates the forward link path loss as described above with reference to equation (7). At block 208, mobile station controller 116 calculates the base station receiver sensitivity as described above with reference to equation (8). Then, at block 210 mobile station 102 transmits an access probe at the mean output power calculated in accordance with equation (9).

The present invention may also be expressed in terms analogous to the expressions for mean output power that are described in IS-95. Specifically, according to the present invention, the following changes may be made to IS-95:

(1) For the first probe:

mean output power(dBm) = −174 +

−mean input power (dBm) + serving pilot (dB) +

PILOT_PWR (dBm) +

RCVR_SENS (dB);

where is the access channel fixed data rate (4.8 kbps) and is the pilot strength of the serving sector.

(2) For subsequent probes, the access probe sequence are sent at increased power levels (each probe is incremented by a value equal to PWR_STEP) until a response is obtained or the sequence ends (see IS-95 section 6.6.3.1).

(3) The initial transmission on the Reverse Traffic Channel is at a mean output power defined by:

mean output power(dBm) = −174 +

−mean input power (dBm) + serving pilot (dB) +

PILOT_PWR (dBm) +

RCVR_SENS (dB).+ the sum of all access probe corrections (dB);

where is the traffic channel data rate (either 9.6 or 14.4 kbps) and is the strength of the reference pilot.

(4) Once the first power control bit has been received after initializing Reverse Traffic Channel transmissions, the mean output power is defined by:

mean output power(dBm) = −174 +

−mean input power (dBm) + serving pilot (dB) +

-continued

PILOT_PWR(dBm) +

RCVR_SENS(dB) + the sum of all access probe corrections (dB) + the sum of all closed loop power control corrections (dB).

Thus, the present invention provides a novel and improved method and system for open loop power control in a CDMA communication system. The present invention overcomes the problems associated with transmitting the first access probe at a nominal power level. Unnecessary interference is reduced, while at the same time increasing the probability of successful reception of the first access probe at the base station by using more accurate determinations of pilot transmit power and receiver sensitivity.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for controlling the power of a mobile station transmission signal in a CDMA communication system having a base station which transmits a pilot signal, the method comprising the steps of:

calculating, in said base station, a base station pilot transmit power value;

calculating, in said base station, a base station receiver sensitivity value;

transmitting said pilot transmit power value and said receiver sensitivity value to said mobile station; and calculating, in said mobile station, a mean output power in response to said base station pilot transmit power value and said base station receiver sensitivity value.

2. The method of claim 1 wherein said step of calculating a mean output power further comprises the steps of:

measuring, in said mobile station, a total received power;

measuring, in said mobile station, a signal to noise ratio of said pilot signal; and calculating a forward link path loss in response to said pilot transmit power value, said total received power, and said signal to noise ratio.

3. The method of claim 2 wherein said signal to noise ratio is a ratio of energy per chip to total power spectral density of said pilot signal.

4. The method of claim 2 further comprising the step of storing said base station pilot transmit power value and said base station receiver sensitivity value in said mobile station.

5. The method of claim 2 wherein said step of calculating said base station receiver sensitivity value further comprises the steps of:

calculating a loading factor in response to a number of simultaneous calls currently being serviced by said base station;

determining a base station receiver noise figure;

determining an access channel ratio of energy per bit to total noise power spectral density; and calculating said base station receiver sensitivity value in response to said loading factor, said base station receiver noise figure, and said access channel ratio of energy per bit to total noise power spectral density.

6. A system for controlling the power of a mobile station transmission signal in a CDMA communication system having a base station which transmits a pilot signal, the system comprising:

a base station controller in said base station, for calculating a base station pilot transmit power value and a base station receiver sensitivity value;

a base station transmitter for transmitting said pilot transmit power value and said receiver sensitivity value to said mobile station; and a mobile station controller in said mobile station, for calculating a mean output power in response to said base station pilot transmit power value and said base station receiver sensitivity value.

7. The system of claim 6 further comprising:

a power measurement circuit in said mobile station, for measuring a total received power; and a demodulator in said mobile station, for measuring a signal to noise ratio of said pilot signal;

and wherein said mobile station controller calculates a forward link path loss in response to said pilot transmit power value, said total received power, and said signal to noise ratio.

8. The system of claim 7 wherein said signal to noise ratio is a ratio of energy per chip to total power spectral density of said pilot signal.

9. The system of claim 7 further comprising a memory element in said mobile station for storing said base station pilot transmit power value and said base station receiver sensitivity value.

10. The system of claim 7 further comprising:

a load monitor, for calculating a loading factor in response to a number of simultaneous calls currently being serviced by said base station;

a memory element in said base station, for storing a base station receiver noise figure; and a receiver in said base station, for determining an access channel ratio of energy per bit to total noise power spectral density;

wherein said base station controller calculates said base station receiver sensitivity value in response to said loading factor, said base station receiver noise figure, and said access channel ratio of energy per bit to total noise power spectral density.

* * * * *